2,908,725
PROCESS FOR THE PRODUCTION OF 2-ALKYL-1-CHLOROALKANES

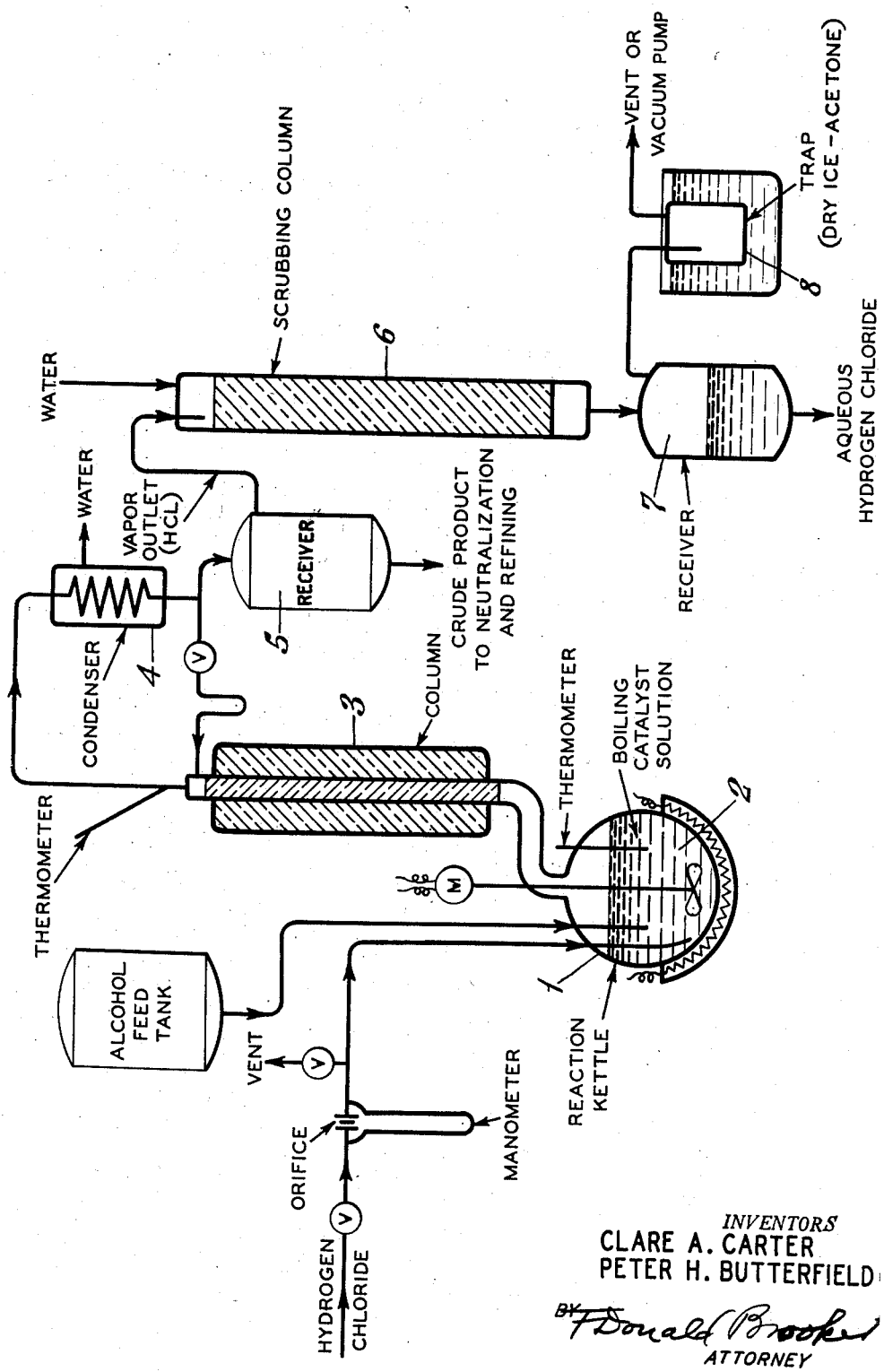

Peter H. Butterfield, Palo Alto, Calif., and Clare A. Carter, South Charleston, W. Va., assignors to Union Carbide Corporation, a corporation of New York Application April 12, 1957, Serial No. 652,398

3 Claims. (Cl. 260—657)

This invention relates to a process for preparing 2-alkyl-1-chloroalkanes.

The classical method for preparing primary n-alkyl chlorides is the reaction of a primary n-alkyl alcohol with hydrogen chloride in the presence of a metal chloride catalyst such as zinc chloride. Later discoveries led to the use of tertiary amine hydrochloride catalysts in place of the metal chloride catalysts.

Attempts to employ these prior art processes in the preparation of 2-alkyl-1-chloroalkanes from the corresponding alcohols have proved generally unsatisfactory. Dehydration of the 2-alkyl-1-alkanols occurs even at low temperatures when metal chlorides or trialkylamine hydrochlorides are employed; since excessive amounts of olefins are formed by the dehydration, the yield of chloride is greatly reduced, and the product is contaminated with the olefin.

It is an object of this invention to provide an improved process for preparing 2-alkyl-1-chloroalkanes from the corresponding alcohols wherein dehydration of the alcohols is minimized.

It is another object of this invention to provide an improved process for preparing 2-alkyl-1-chloroalkanes wherein the product is substantially free from olefinic contamination.

Other objects will be apparent from the disclosure.

These objects are achieved by esterifying 2-alkyl-1-alkanols with hydrochloric acid in the presence of a secondary amine hydrochloride catalyst.

The alcohols that are included within the scope of the present invention are those which can be represented by the formula:

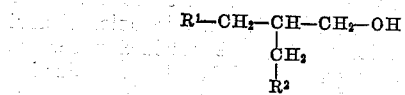

where $R^1$ and $R^2$ are hydrogen or alkyl groups. The preferred forms are those where $R^1$ and $R^2$ are selected from the group consisting of hydrogen and alkyl groups containing up to 8 carbon atoms.

The secondary amine hydrochloride catalyst can be represented by the general formula:

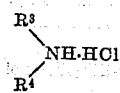

wherein $R^3$ and $R^4$ are alkyl groups containing at least six carbon atoms. In the preferred catalyst, $R^3$ and $R^4$ are alkyl groups having from six to twenty carbon atoms.

In the practice of the invention anhydrous hydrogen chloride gas and the 2-alkyl-1-alkanol are reacted in the presence of an appropriate secondary amine hydrochloride catalyst to form 2-alkyl-1-chloroalkane which is removed.

To assure a reasonable working concentration of hydrogen chloride in the reaction vessel, the anhydrous gas is fed continuously. For this reason continuous operation is desirable. However, the process may be conducted in batch operation to produce the 2-alkyl-1-chloroalkanes.

The amine hydrochloride catalyst is catalytically effective over a broad concentration range. Satisfactory results have been obtained with from 10 weight percent to 90 weight percent of catalyst in the total charge. However, the preferred concentration is from 30 to 60 weight percent of catalyst.

The catalyst may be prepared by passing at least a stoichiometric amount of anhydrous hydrogen chloride directly into the amine. However, it may be conveniently prepared in the reaction vessel by charging the reaction vessel with an amine-alcohol mixture and passing anhydrous hydrogen chloride into the mixture until there is evidence of "break-through" of the gas. At this point the hydrochlorination of the amine is essentially completed. The reaction vessel may then be prepared for the main reaction between the alcohol and the hydrogen chloride. Since the hydrochloride is often less soluble in the alcohol than the amine, this latter method of hydrochloride preparation is preferred; the solution of the hydrochloride in the alcohol is effected more rapidly.

The amine hydrochlorides that are suitable as catalysts for the reaction are those derived from dialkyl secondary amines having at least six carbon atoms in each alkyl group. These hydrochlorides are soluble in the 2-alkyl-1-alkanol employed in this invention to the degree necessary to insure a high efficiency of alcohol consumption throughout the reaction. It has been found that a solubility of at least 30 weight percent of the catalyst in the boiling alcohol is necessary to obtain reasonable production rates.

A reaction temperature between 40° C. and 300° C. has been found to be operable for this invention. Best results may be obtained by reacting the alcohol and acid in the range of 180° C. to 215° C.

The reaction temperature can be controlled in all cases by varying the pressure on the reactor so that the alcohol-amine hydrochloride mixture boils in the range of 180° C. to 215° C. For example, alcohols such as 2-ethylbutanol and 2-methylpentanol could be reacted advantageously at such super-atmospheric pressures to elevate the boiling temperature to between 180° C. and 215° C. Higher molecular weight alcohols are reacted preferably at reduced pressure so that the boiling temperature of the alcohol and catalyst mixture does not exceed 215° C.

Most of the alcohol that reacts is converted to the desired chloride product. When reflux conditions are employed for the reaction, the rate of feed of hydrogen chloride is most advantageously maintained in the range of from 0.2 to 0.4 pound per hour per gallon of amine-alcohol mixture.

In a continuous process employing the method of this invention, the 2-alkyl-1-chloroalkanes may be continuously distilled as a vapor and collected overhead, while fresh alcohol is fed into the reaction system to maintain a constant volume of reactants.

The single figure represents one apparatus which is suitable for the purposes of this invention. Dry hydrogen chloride is fed into a stirred, heated reaction kettle 1 containing a solution 2 of the catalyst in the reactant alcohol. The product is distilled continuously from the reaction mixture through a distilling column 3 into a water-cooled condenser 4. Part of the condensed product passes into the receiver 5 and the balance is recycled to the column for reflux. The uncondensed distillate disengages from the liquid products in the receiver 5 and passes into the scrubbing column 6 concurrently with a stream of water. The hydrogen chloride is absorbed in the water and the aqueous solution collects in receiver 7 while the balance of the gaseous product passes through trap 8 which is vented to the atmosphere of a vacuum pump.

In an example of the invention employing apparatus of the type just described, one thousand grams (7.7 mols) of 2-ethylhexanol and 624 grams (2.6 mols) of di-(2-ethylhexyl)amine were charged to a 3-liter, glass reaction kettle attached to a glass-packed fractionating column and equipped with a water cooled, variable-reflux head. The reaction kettle was fitted with a motor-driven stirrer, a bottom inlet for hydrogen chloride and an inlet tube for continuously feeding 2-ethylhexanol to the reaction mixture. Dry hydrogen chloride was passed rapidly into the stirred solution of alcohol and amine, while the kettle was slowly heated, until the break through of the hydrogen chloride at the surface indicated that formation of the amine hydrochloride was complete. The flow of hydrogen chloride was discontinued until the temperature of the mixture reached 195° C. and vapors began to reflux to the column. The flow of hydrogen chloride gas was then continued, and it was passed into the boiling mixture at a rate of 55 grams per hour. Additional 2-ethylhexanol was added continually so that a constant volume of liquid was maintained during the course of the reaction.

Sufficient reflux was maintained at the head of the fractionating column to hold the vapor temperature at approximately 100° C. The crude product not returned as reflux together with unreacted hydrogen chloride vapor passed into a receiver. Here the liquid and vapor products disengaged and the vapor, largely hydrogen chloride passed into the water scrubber. The liquid product in the receiver comprising 60 percent by weight of 2-ethylhexyl chloride and 40 percent by weight of 2-ethylhexanol was neutralized with aqueous sodium bicarbonate, and distilled to yield refined 2-ethylhexyl chloride.

Employing a similar procedure as outlined in the first example, 2-ethylbutyl chloride was synthesized from 2-ethylbutanol and hydrogen chloride using di(1,3-dimethylbutyl)amine as the catalyst. A kettle charge of 295 grams of 2-ethylbutanol and 185 grams of di(1,3-dimethylbutyl) amine was reacted with 35 grams of hydrogen chloride. A boiling temperature of 154–158° C. was maintained at atmospheric pressure. The reaction was conducted over a period of four hours and 25 minutes, during which time 664 grams of 2-ethylbutanol and 304 grams of hydrogen chloride were fed to the boiling mixture containing the catalyst. The crude product was continually removed overhead at a vapor temperature of 112–128° C. to give a total product of 626 grams. After washing with water and fractionating, a 65 gram fraction containing 83 percent 2-ethylbutyl chloride was recovered having the following properties: normal boiling point of 120° C.; specific gravity 20/20° C. of 0.890. A yield of 10.3 percent of 2-ethylbutyl chloride was obtained.

A charge of 295 grams of 2-methylpentanol and 185 grams of di(1,3-dimethylbutyl) amine was placed in the reaction vessel as in the first example and dry hydrogen chloride gas was passed into the mixture until no further reaction occurred. The temperature was then elevated to 154–158° C. and 613 grams of 2-methylpentanol and 260 grams of hydrogen chloride were fed into the boiling mixture. The product was removed overhead to give 735 grams of product containing 155 grams of 2-methylpentyl chloride. The crude product was washed, and fractionated, and the product-rich fractions were refractionated. The 2-methylpentyl chloride was recovered at a yield of 21 percent. The product had the following physical properties: normal boiling point of 124–125° C.; specific gravity 20/20° C. of 0.878.

The preparation of 2-alkyl-1-chloroalkanes initially employing a secondary amine chloride catalyst directly with the alpha-alkyl alcohol as distinguished from the formation of the amine salt by passing dry hydrogen chloride gas into an amine-alcohol reaction mixture, is also a practice of the present invention.

As an example of the preparation of 2-alkyl-1-chloroalkanes employing a catalyst that is not prepared in the reaction vessel, di(2-ethylhexyl) amine catalyst was prepared by charging 483 grams (2 mols) of the amine to a flask equipped with stirrer. Hydrogen chloride, 95 grams, of which 71 grams was absorbed by the amine, was fed to the flask over a period of two hours and 15 minutes at a temperature of 120–150° C. On standing, the catalyst remained a viscous fluid, with no visible salt separation, for a period of two weeks.

The di(2-ethylhexyl) amine hydrochloride catalyst, as prepared, was transferred to a reaction flask containing 385 grams of 2-ethylbutanol.

The mixture was boiled at atmospheric pressure at a temperature range of 157–163° C. while 664 grams of 2-ethylbutanol and 295 grams of hydrogen chloride were fed to the kettle over a period of four hours. During this time 742 grams of crude product were obtained. This crude product was washed with dilute aqueous caustic soda and finally with water. The washed product contained 75.0 grams of 2-ethylbutyl chloride which represented a yield of 9.5 percent.

Following the same procedure employed in the first example, 2-ethylhexyl chloride was prepared using di(2-ethylhexyl) amine hydrochloride as a catalyst. The operating conditions were varied and the effects of these variations are shown in Table I. In this table, "Actual production rate" refers to the rate obtained under the reaction conditions shown. The "Calculated production rate" was calculated from the actual production rate assuming a uniform hydrogen chloride flow rate of 0.25 pound per hour per gallon of kettle charge all other conditions being the same.

TABLE I

*Production of 2-ethylhexyl chloride using di(2-ethylhexyl)amine hydrochloride as catalyst*

| Catalyst Conc., Percent | Conditions | | Hydrogen Chloride | | 2-Ethylhexanol | | 2-Ethylhexyl Chloride Production Rate, lb./hr./gal. | |
|---|---|---|---|---|---|---|---|---|
| | Temp., °C. | Press., mm. Hg | Feed Rate, lb./hr./gal. | Conversion, Percent | Conversion, Percent | Efficiency, Percent | Actual | Calculated |
| 20 | 187 | 750 | .258 | 17.1 | 44 | 99.1 | .180 | .17 |
| | 174 | 503 | .235 | 7.7 | 25.7 | 99.4 | .074 | .08 |
| | 195 | 750 | .278 | 26.2 | 82.0 | 99.3 | .293 | .26 |
| 35 | 184 | 429 | .223 | 9.9 | 14.8 | 98.4 | .089 | .10 |
| | 175 | 353 | .184 | 6.7 | 11.3 | 99.3 | .050 | .07 |
| | 211 | 750 | .226 | 34.0 | 82.0 | 88.2 | .283 | .31 |
| 50 | 195 | 513 | .268 | 24.9 | 51.8 | 98.8 | .274 | .26 |
| | 184 | 299 | .235 | 9.8 | 14.8 | 98.5 | .094 | .10 |
| | 176 | 201 | .144 | 4.1 | 3.4 | 96 | .024 | .04 |

TABLE II
Comparison of catalysts for production of 2-ethylhexyl chloride

| Catalyst | | Conditions | | | Hydrogen Chloride | | Alcohol—Efficiency, Percent | 2-Ethylhexyl Chloride Production Rate, lb./hr./gal. | |
|---|---|---|---|---|---|---|---|---|---|
| Type | Conc.,wt. Percent | Temp., °C. | Press., mm. Hg | Feed Rate, lb./hr./gal. | Conversion, Percent | | | Actual | Calculated |
| Zinc chloride | 5.3 | 140 | 155 | .35 | 9.3 | | 91 | .13 | .076 |
|  | *13.1 | 150 | 165 | .149 | 45.8 | | 60 | .27 | .36 |
|  | 16.8 | 150 | 130 | .152 | 46.4 | | 35 | .28 | .36 |
| Di(2-ethylhexyl)amine | 35 | 195 | 755 | .278 | 27 | | 99 | .29 | .23 |
|  | *50 | 211 | 755 | .226 | 35 | | 88 | .28 | .26 |
| Tri(n-butyl)amine | *38 | 195 | 750 | .32 | 32 | | 65 | .40 | .29 |

The superiority of the process of this invention may be demonstrated by comparing it to other processes. Table II contains such a comparison. By the same technique employed in the first example, 2-ethylhexyl chloride was prepared using the several catalysts shown in Table II. The catalyst charges which are marked with an asterisk in the table were roughly adjusted to a standard concentration of 1.6 equivalents per liter. The calculated production rate was based on a hydrogen chloride production rate of 0.20 pound per hour per gallon of kettle charge.

The tertiary amine catalyst, tri(n-butyl) amine tended to crystallize in the alcohol during the reaction. Attempts to increase the rate of chloride production with the zinc chloride catalyst caused excessive dehydration, thereby diminishing the alcohol efficiency. The process of the present invention gives high efficiencies with high yields at production rates comparable to the production rates obtained using other catalyst.

While the novel process of this invention has generally been described with respect to a particular type of apparatus and series of steps, no such limitation is meant to apply. Variations in the apparatus and steps will be obvious to those skilled in the art upon examining the present disclosure.

What is claimed is:

1. A process for the production of 2-ethylhexyl chloride, whereby the formation of olefins is substantially minimized, comprising reacting hydrogen chloride and 2-ethylhexanol in the presence of di(2-ethylhexyl) amine hydrochloride at temperatures in the range of 180° C. to 215° C.

2. A process for the production of 2-ethylhexyl chloride, whereby the formation of olefins is substantially minimized, comprising reacting hydrogen chloride and 2-ethylhexanol in the presence of di(2-ethylhexyl)amine catalyst at temperatures in the range of 180° C. to 215° C.

3. A process for the production of 2-ethylhexyl chloride, whereby the formation of olefins is substantially minimized, comprising continuously contacting hydrogen chloride and 2-ethylhexanol in the presence of di(2-ethylhexyl)amine hydrochloride catalyst at temperatures in the range of 40° C. to 300° C. and continuously distilling the 2-ethylhexyl chloride as it is formed.

References Cited in the file of this patent

UNITED STATES PATENTS 2,570,495      Scott      Oct. 9, 1951